July 8, 1952  R. L. SINCLAIR  2,602,557
VEHICLE PARKING APPARATUS
Filed Jan. 13, 1947  5 Sheets—Sheet 1

INVENTOR
RICHARD L. SINCLAIR
BY
*Mason & Graham*
ATTORNEYS

July 8, 1952        R. L. SINCLAIR        2,602,557

VEHICLE PARKING APPARATUS

Filed Jan. 13, 1947        5 Sheets-Sheet 2

INVENTOR
RICHARD L. SINCLAIR
BY
Mason & Graham
ATTORNEYS

July 8, 1952  R. L. SINCLAIR  2,602,557
VEHICLE PARKING APPARATUS
Filed Jan. 13, 1947  5 Sheets-Sheet 3
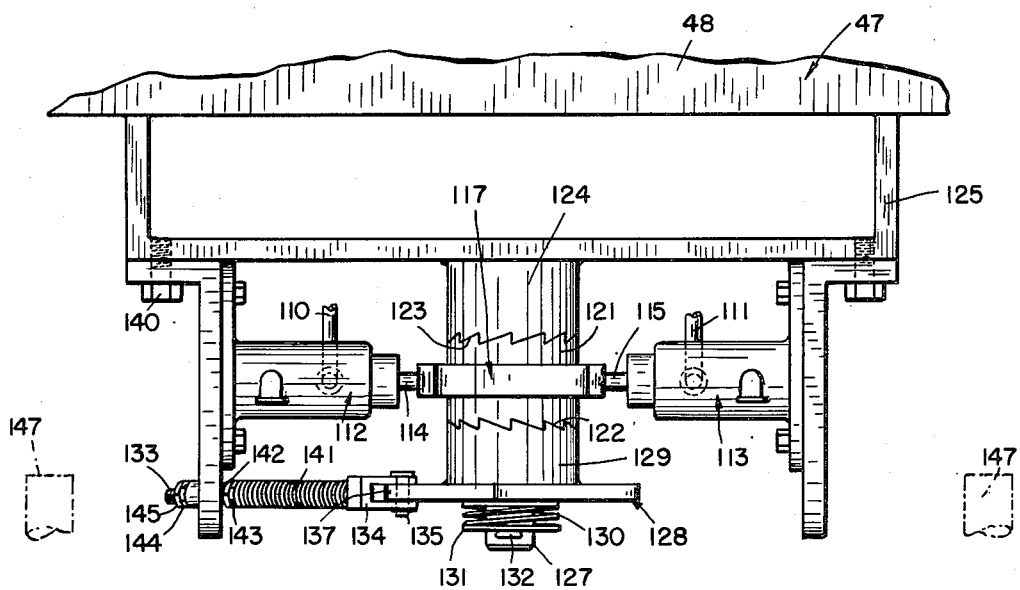
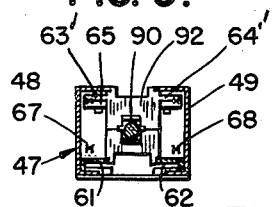
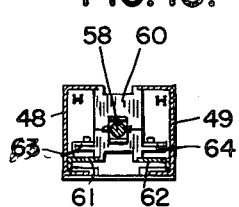
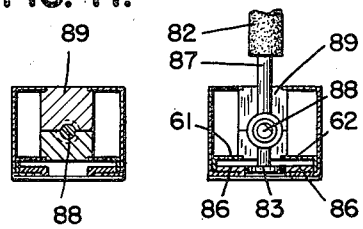
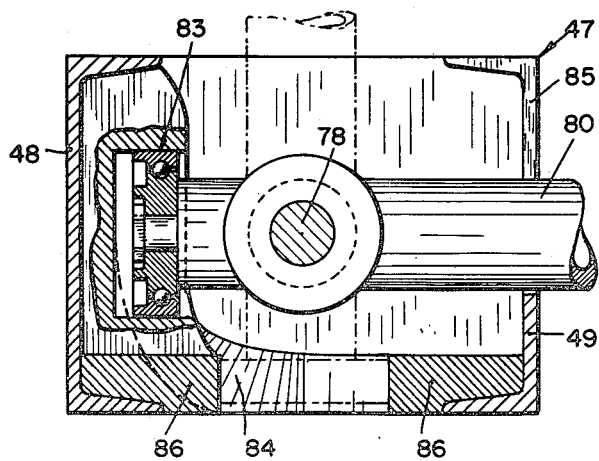
INVENTOR
RICHARD L. SINCLAIR
BY
Mason & Graham
ATTORNEYS

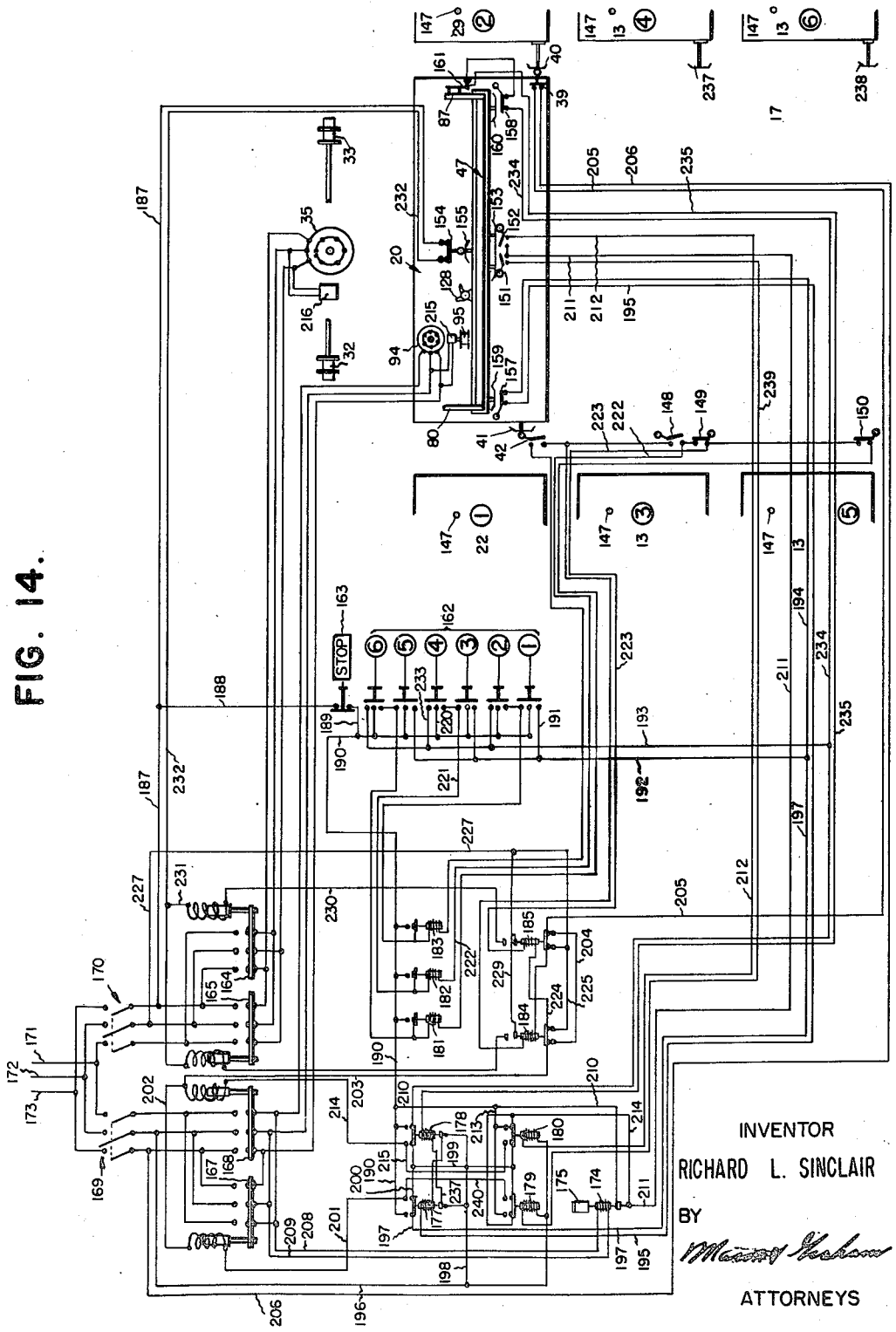

July 8, 1952 — R. L. SINCLAIR — 2,602,557
VEHICLE PARKING APPARATUS
Filed Jan. 13, 1947 — 5 Sheets-Sheet 5

INVENTOR
RICHARD L. SINCLAIR
BY
Mason & Graham
ATTORNEYS

Patented July 8, 1952

2,602,557

UNITED STATES PATENT OFFICE 2,602,557

VEHICLE PARKING APPARATUS

Richard L. Sinclair, Los Angeles, Calif., assignor to Park-O-Mat, Inc., Los Angeles, Calif., a corporation of California Application January 13, 1947, Serial No. 721,794

7 Claims. (Cl. 214—16.1)

My present invention relates to the parking and storing of automobiles, and more particularly to the automatic parking of automobiles in selected stalls in a storage accommodation area.

Various development have been made in the past for the more or less automatic parking of automobiles in storage areas, and included among these prior developments is my copending application, Serial No. 523,959, filed February 25, 1944, and now Patent No. 2,428,856, granted October 14, 1947.

An object of the present invention is to make an improved automobile parking system.

Another object is to improve the method for parking automobiles in predetermined parking stalls.

Another object is to make a parking device wherein an automobile placed in an initial parking area is seized by a positioning apparatus and transported to a pre-selected parking stall, all of the procedures being performed substantially automatically.

Another object is to make an improved automobile parking arrangement including a transfer carriage having automobile positioning and transporting mechanism thereon with improved means for actuating and releasing the automobile positioning mechanism at predetermined stages of parking and handling automobiles.

Another object is to make an improved arrangement for handling automobile positioning and transporting means in an automobile parking arrangement.

Another object is to make an improved automobile positioner for incorporation in an automobile parking arrangement.

Another object is to make an improved circuit arrangement for an automobile parking system whereby various sequences of parking operations may be performed from a master station.

Another object is to incorporate with an improved arrangement for the parking of automobiles, a simplified device for operating and releasing an automobile positioner operatively associated therewith.

In order to attain these and other objects and advantages of the invention, which will appear as the present specification progresses, a parking area is provided with a plurality of stalls which may be all on the same level, or may be on successive levels, one above the other. One or more of the stalls is selected as an entrance stall, and a stall which may be the same as an entrance stall, or which may be any other suitable stall in the parking arrangement, is selected as an exit stall.

The parking stalls preferably are arranged in parallel oppositely disposed rows, the rows being separated from each other by a space equal approximately to the length of a stall. A transfer device is mounted to operate lengthwise between opposite rows of stalls.

Where a plurality of parking levels are employed, an elevator is provided in the entrance stall so that when necessary the automobiles first may be moved vertically to a desired level before being moved onto a transfer device for parking in the selected level.

The transfer device has a carrier mounted thereon and arranged to operate transversely of the carrier to move automobiles into and out of their respective parking stalls. An automobile positioner is mounted on the carrier and is arranged to engage the bumpers of an automobile to hold it immobilized in proper centralized position relatively to the carrier during parking, unparking and transfer operations. The positioner includes a pair of bumper engaging arms mounted on the carrier and arranged to be moved into and out of engagement with the bumpers of an automobile by suitable mechanism on the carrier.

These and other features of the invention are more fully brought out in the following description of an illustrative embodiment of my invention, and in the accompanying drawings, of which there are five sheets.

In the drawings:

Fig. 8 is a plan view of the structure shown in Fig. 6;

Fig. 9 is a fragmentary sectional view taken on the line 9—9 of Fig. 3;

Fig. 10 is a fragmentary sectional view taken on the line 10—10 of Fig. 3;

Fig. 11 is a fragmentary sectional view taken on the line 11—11 of Fig. 3;

Fig. 12 is a sectional view taken on the line 12—12 of Fig. 3, as the parts would appear with an operating piston actuated to draw a pair of ear positioning arms inwardly into bumper engaging position;

Fig. 13 is an enlarged fragmentary sectional view taken on the line 13—13 of Fig. 3; and Fig. 14 is a schematic circuit drawing of a control circuit employed to operate the apparatus.

Figure 1:
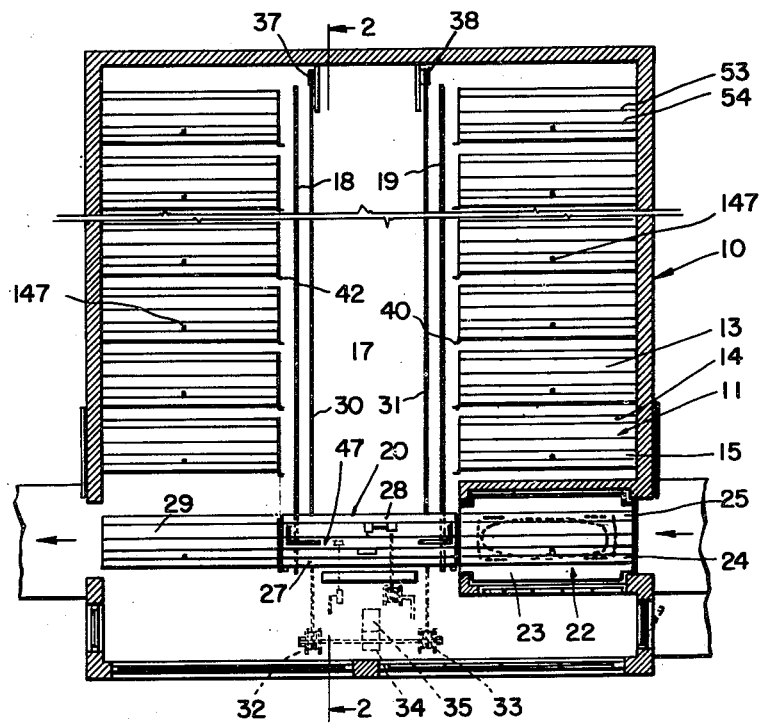
Fig. 1 is a horizontal sectional view through a multi-level parking structure, an intermediate portion thereof being broken away.
Figure 2:
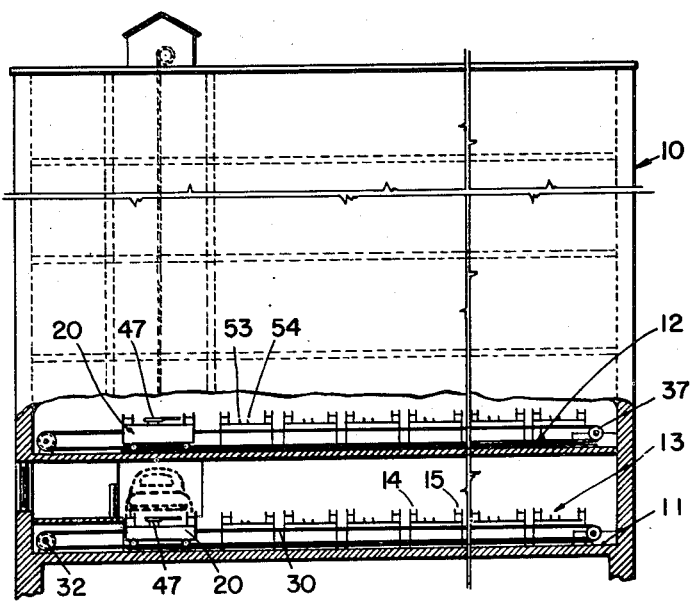
Fig. 2 is a sectional view taken as on the line 2—2 of Fig. 1.

Referring to the structural and operational features of the illustrated embodiment of my present invention, a structure 10 may comprise one floor level, or may have a plurality of floor levels of which the first two 11 and 12 are illustrative. The structure 10 need not be a building in the usual sense of the word, since any suitable supporting structure will serve the purpose provided it gives adequate support to the parking stalls. The widest degree of selection therefore is open to an architect or engineer in designing a structure for my present invention.

On each floor of the structure 10 a plurality of parking stalls 13 are arranged in two parallel rows. Each of the parking stalls is provided with a pair of channeled runways 14 and 15 to receive the wheels of an automobile, and to guide the wheels during movement of the automobile into and out of a stall. The parallel rows of stalls are separated by a runway 17 with rails 18 and 19 mounted on opposite sides thereof.

A transfer table 20 has flanged supporting wheels 21, as illustrated in Figs. 1–5, to ride on the rails 18 and 19. In the arrangement illustrated in Fig. 1 an entrance stall 22 has an elevator 23 mounted therein. This elevator is provided with usual automatic elevator controls to permit moving it automatically to a selected level and to stop it at the selected level. The entrance stall elevator has channeled wheel guides 24 and 25 therein similar to those in the parking stalls, and these channels are mounted to align with similar channels 27 and 28 mounted on the transfer table.

An exit stall 29, as illustrated in Fig. 1, is provided opposite to the entrance stall, but as previously mentioned may stall having an exit opening available therefrom may be selected as the exit stall. If desired, the entrance stall itself may be used as an exit stall, but in such case it would be necessary to drive a parked car being taken out of parking, clear of the entrance stall before the next car could be driven therein for parking.

Figure 5:
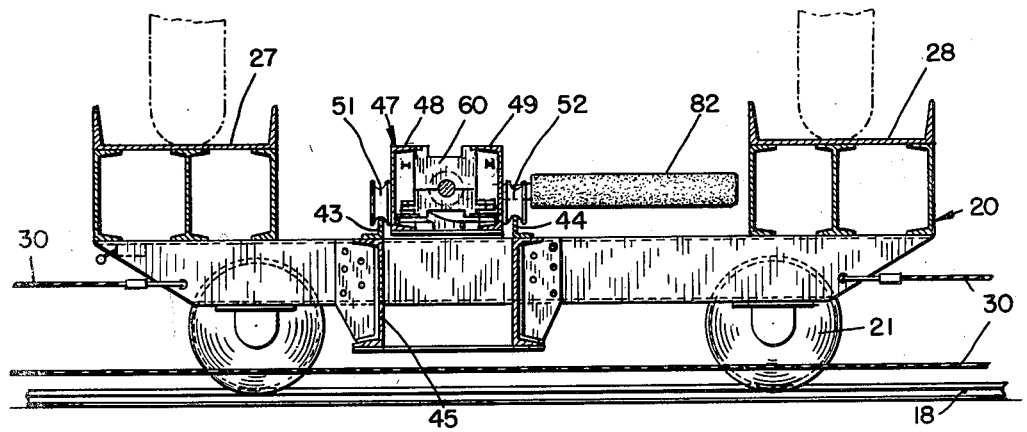
Fig. 5 is a sectional view taken on the line 5—5 of Fig. 3.

The transfer table 20 is arranged to be moved along the tracks 18 and 19 by parallel drive cables 30 and 31 which are wound on winches 32 and 33 driven through a speed reducer 34 by a reversible motor 35. The cables pass around idler pulleys 37 and 38 at the opposite end of the runway 17 from the driving motor, and each upper run of the drive cables is secured to the transfer table, as shown in Fig. 5.

A cam actuated switch 39 is mounted on the end of the transfer table, and a cam 40 is mounted to actuate the switch 39 when the transfer table is aligned with the entry stall. A cam 41 is mounted on the other end of the transfer table, and this cam is arranged to engage successively a plurality of cam actuated switches 42 during movement of the transfer table up and down the runway.

A pair of carriage supporting tracks 43 and 44 (see Figs. 3, 4 and 5) are mounted transversely of the transfer table. These tracks are supported on a box girder structure 45 which also forms a main transverse structural member of the transfer table. A carriage 47 comprises a pair of inwardly facing channel members 48 and 49 secured to each other by suitable bracing means. Ball bearing supported grooved rollers 51 and 52 are mounted on the sides of the carriage and ride on the tracks 43 and 44.

Each stall also is provided with a pair of carriage supporting tracks 53 and 54 extending longitudinally thereof, which are positioned to align with the carriage support tracks 43 and 44 when the transfer table is stopped in registry with a selected pair of stalls.

A cylinder 55 is mounted longitudinally of the carriage between the channel members 48 and 49, and a pneumatically actuated piston 57 is mounted in the cylinder. A piston rod 58 extends through a gland packing 59 on an end of the cylinder, and has clevis connection with a sliding block 60. The block 60, as shown in Figs. 9 and 10, is mounted slidably between the inner edges of the upper flanges of the carriage side channels 48 and 49 and the inner edges of a pair of angle iron members 61 and 62 which are mounted within the channels 48 and 49. The sliding block 60 has a pair of chain gripping extensions 63 and 64 extending outwardly therefrom near the upper end of each side thereof, and clamp members 65 are provided to secure motion transmitting chains 67 and 68 to the block.

The chains 67 and 68 are mounted to run over idler sprockets 70 and 71 pivoted on the inner walls of the channel members 48 and 49, respectively. The sliding block 60 has a second clevis connection to a rod portion 75 which is connected, through a swivelled connecting member 77, to a second rod portion 78. The second rod portion 78 is pivoted to rotate in an opening through a slide block 79. The slide block 79 is mounted slidably between the upper channel flanges and the angle members 61 and 62 similarly to the block 60.

A vehicle positioning arm 80 is secured to the outer end of the pivoted rod portion 78. This positioner has an upwardly extending bumper engaging portion encased in a rubber sleeve 82, and is long enough to insure its engaging an automobile bumper at the maximum height at which such bumpers normally are mounted. An opposite or downwardly extending end of the positioning arm 80 extends downwardly a short distance below the rod portion 78, and has a ball bearing roller 83 pivoted on its lower end in position to ride in a cam track between the inner edges of plates 86 secured to the bottom flanges of the carriage side channels 48 and 49, see Fig. 13.

A curved cam path 84 is provided as an extension on each end of the cam track between the plates 86, so that when the positioning arms are moved outwardly to their fullest extent, the roller 83 will be carried around a quarter turn of a helical path. This swings the positioner arm downwardly to a horizontal position, as illustrated in Fig. 13, to permit inserting or withdrawing the carriage from beneath an automobile. The ends of the channel member 48 are cut away, as at 85 (see Fig. 13), to permit this downward swinging movement of the positioner arm.

The cam track between the plates 86 at the other end of the carriage also is provided with a similar helical path and cut away portion so that a second similar positioner arm 87 will operate in the same manner described for the first positioner arm 80. The second positioner arm 87 also is connected pivotally to a rod portion 88 which is mounted pivotally in an opening in a slide block 89. The rod portion 88 has swivel connection with a rod portion 90 which is connected, by a clevis connection, to a slide block 92.

The slide block 92 is substantially the same as the first clevis slide block 60, with the exceptions that its chain gripping extensions 63', 64' are positioned to grip the upper runs of the chains 67 and 68, as shown in Fig. 9; and that it has no connection with a piston rod. In this manner movement of the first slide block 60, by the piston 57, is transmitted directly to the positioner 80; and in a reverse direction through the chains 67 and 68 and their associated parts, to the other positioner 87.

Figure 4:
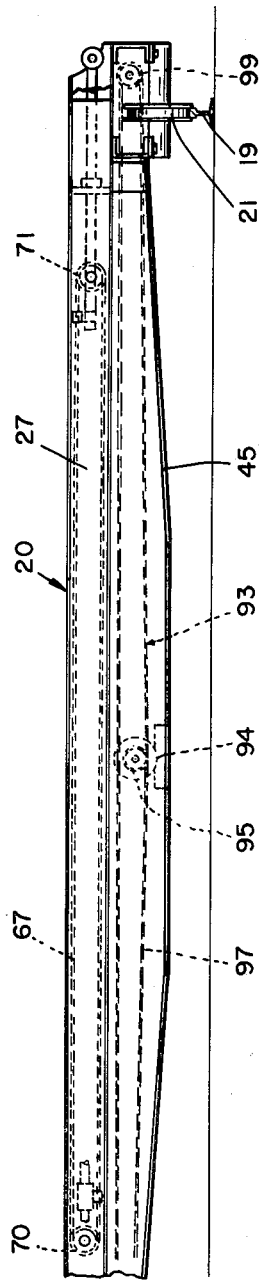
Fig. 4 is a fragmentary end elevational view of the structure of Fig. 3.

Drive means for moving the carriage endwise on the transfer table comprises a cable drive mechanism 93 illustrated in Fig. 4. Since this carriage drive mechanism is generally similar to that illustrated and described in my copending application above referred to, it will be unnecessary to describe this feature in detail. Briefly, however, it comprises a reversible motor 94 arranged to drive a winch 95 through suitable reduction gearing. A cable 97 is connected from the winch over idler pulleys 99 on opposite ends of the carriage. By operating the motor in a selected direction the carriage 47 can be moved endwise into a stall on either side of the transfer table and then withdrawn therefrom back into its position centrally of the transfer table.

Operation of the positioners 86 and 87 is accomplished by admitting pressurized fluid, such as compressed air, to a selected end of the cylinder 55. A pair of tubes 101 and 102 are connected to open into opposite ends of the cylinder 55. The other ends of these tubes are connected to a two-way pneumatic valve 103. This valve is of the pneumatic impulse operated type so that when air is released from one end of the valve 103 the valve will be moved thereby to one operative position, and when air is released from the other end thereof the valve will be moved to its other operative position.

The valve is connectd by means of a pipe 104 through a usual type of air cleaner 105, and thence is connected to a flexible air hose 108. This hose 108 is carried on a spring loaded reel mounted in a casing 109 so as to take up slack in the hose during movement of the carriage on the transfer table. The other end of the hose on the reel is connected to a suitable supply of compressed air.

Figure 6:
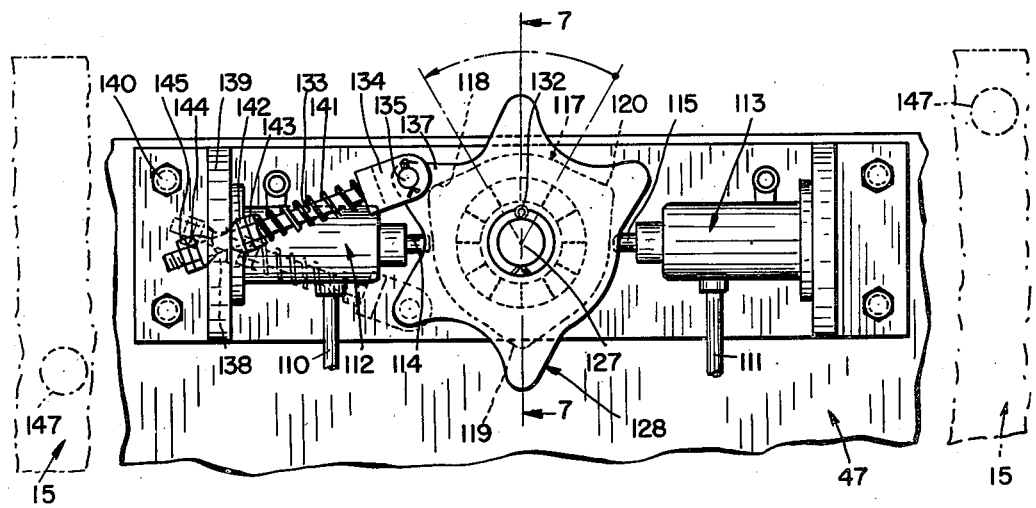
Fig. 6 is an enlarged fragmentary side elevational view of a hydraulic valve actuating mechanism as it would appear viewed from the direction of the arrows 6—6 in Fig. 3.

Small tubes 110 and 111 are connected one to each side of the housing of the valve 103, the other ends of these tubes being connected one to each of two cam actuated relief valves 112 and 113 (see Figs. 6 and 8). These relief valves are each provided with spring loaded operating buttons 114 and 115 which are positioned in axial alignment with, and opposite to, each other.

A cam 117 is mounted between the buttons 114 and 115, the cam having three lobes 118, 119 and 120 thereon, separated from each other by angles of 120°. This three lobed cam initially is positioned with one of its lobes 30° ahead of a selected relief valve button 114 or 115 which it is desired to operate next. Thereafter, upon each operation of the cam through an angle of 60°, the valve buttons will be operated alternately in succession.

The cam 117 is provided with a central annular hub portion 121, the end faces 122 and 123 of which are each formed with circular ratchets. Each tooth of the ratchets, as illustrated, extend through a circular distance of 30° of each end face of the hub. The ratchet teeth on opposite ends of the cam hub slope oppositely to each other, as best shown in Fig. 8.

Figure 7:
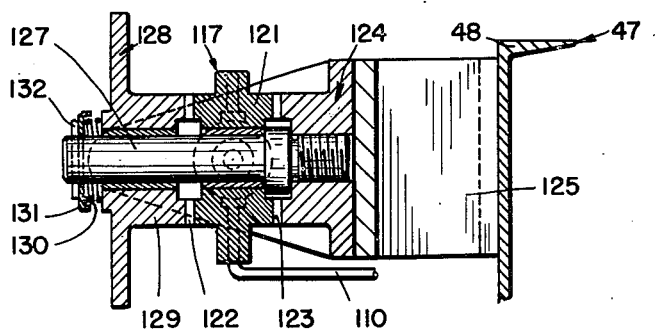
Fig. 7 is a sectional view taken on the line 7—7 of Fig. 6.
Figure 3:
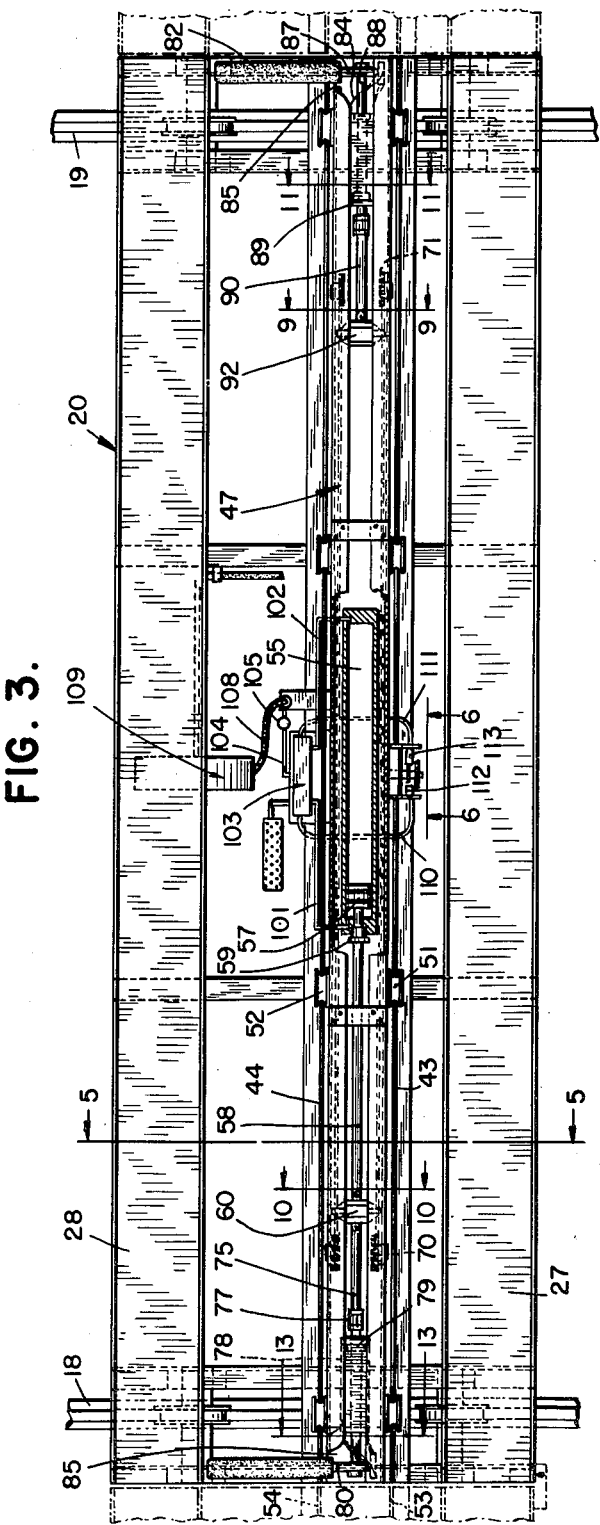
Fig. 3 is an enlarged fragmentary plan view of a transfer table illustrated in Figs. 1 and 2.

A cam supporting member 124 is secured to a supporting bracket 125 which in turn is mounted on a side of the carriage. The outer end of the support 124 is provided with a circular ratchet adapted to have ratchet engagement with the ratchet on the inner end of the cam hub. The support 124 has a pivot stud 127 threadedly secured therein, as shown in Fig. 7, the pivot stud being adapted pivotally to support the three lobed cam 117 thereon. A cam actuating star wheel 128 also is pivoted on the stud 127.

The star wheel 128 preferably is shaped like a six-pointed star, with the exception that one point of the star may be omitted, as shown in Fig. 6. This cam actuating star wheel has an annular hub portion 129, the inner face of which is provided with ratchet teeth adapted to have ratchet engagement with the ratchet teeth on the outer face of the cam hub 121. The star wheel 128 and the cam hub 121 both are urged inwardly toward the base 124 by a coil compression spring 130, which is held in compression between the outer face of the cam hub 121 and a washer 131 which is retained by a cotter key 132 inserted in a hole through the pivot stud 127.

A rod 133 having a clevis end portion 134 is connected by a pivot pin 135 to a point 137 of the star wheel. The rod 133 is mounted for wobble motion in an opening 138 in an angle bracket 139 which is secured to the supporting bracket 125, as by bolts 140.

A second coil compression spring 141 is held in compression between the clevis end portion of the rod 133 and an adjusting nut 142, threaded onto the rod 133 and secured in position thereon by a lock nut 143. A similar pair of nuts 144 and 145 are threaded onto the outer end of the rod 133 to retain it in position in the opening 138.

A pin 147, for operating the cam actuating star wheel (see Figs. 1 and 14), is provided in each parking stall to engage a projecting point of the star wheel as the carriage approaches its limit of movement into a stall. In each stall, on the right hand side of the central runway, the pins 147 are positioned to be struck by an upwardly projecting point of the star wheel 128 to rotate the star wheel initially in a counterclockwise direction as the carriage enters the stall. These same pins also will strike the upwardly projecting point of the star wheel from the opposite direction to rotate it reversely through the same angle as the carriage is withdrawn from the stall. In the stalls on the left hand side of the runway, the pins 147 are arranged to strike the lower projecting points of the star wheel as the carriage enters and leaves a stall so as to rotate the star wheel first in a counterclockwise direction, then in a clockwise direction, the same as in the stalls on the right hand side of the runway.

On each operation of the star wheel, in a counterclockwise direction, it rotates the cam 117 with it carrying the spring pressed clevis rod 133 past dead center. The coil compression spring 141 then snaps the star wheel over and moves the clevis rod to the dotted line position of Fig. 6. The outer nuts 144 and 145 limit the throw of the star wheel to just over 60° so as to insure a two tooth ratchet movement of the cam on each complete cycle of operation of the star wheel.

Referring now to Fig. 8 in conjunction with Fig. 6, it will be noted that as the star wheel is swung in a counterclockwise direction through an angle of 60° by the action of the pin 147 as the carriage enters a stall, the ratchet teeth on the hub of the star wheel will carry the cam 117 with it through the angle of 60°. During this rotative movement the ratchet teeth on the inner end of the cam hub 121 will cam over two 30° ratchet teeth on the base 124, by compressing the spring 130 on the pivot post.

During the reverse 60° rotative movement of the star wheel back to its starting position, the cam 117 will be held against reverse rotation by engagement of the ratchet teeth on the inner end of the cam hub with those on the base, while the ratchet teeth on the outer end of the cam hub will cam over two teeth on the inner end of the star wheel, hub 129, compressing the spring 130 as required.

As stated previously, the cam initially is set with one lobe, for example the lobe 118, positioned 30° behind the next valve button 114 to be operated (see Fig. 6). This positions the second cam lobe 119 90° behind the opposite valve button 115, while the third cam lobe 120 will be positioned 150° behind the first valve button 114. The cam buttons thus will be operated alternately in sequence on each 60° advance of the cam.

Each of the buttons 114 and 115 on actuation by a cam lobe is arranged to open its associated relief valve 112 and 113 respectively, to permit a jet of air to escape through the valve thus operated. This produces alternate operation of the impulse actuated two way main valve 103 which thereby alternately introduces compressed air to opposite ends of the cylinder 55.

The circuit shown in Fig. 14 illustrates the principal operative control features for operating a parking system embodying my present invention. The illustrative circuit is shown as controlling the operation of a unit of six parking stalls arranged three on each side of the central runway 17 in which a transfer table 20 is mounted to ride on the rails 18 and 19, as previously described. The circuit may be extended as required to accommodate any desired number of stalls, and may be substantially duplicated for the number of floors required.

In Fig. 14 the cam operated switch 39 on the right hand end of the transfer table is mounted so as to be closed only when in contact with a stall alignment cam such as the cam 40 and other similar cams 237 and 238, mounted on stalls 4 and 6 respectively. The stalls in the right hand row are numbered 2, 4 and 6, while those in the left hand row are numbered 1, 3 and 5.

The cam 41 previously referred to is shown as mounted on the left hand end of the transfer table in Fig. 14 and is arranged to operate the switch 42 and similar switches 148, 149 and 150, during the travel of the transfer table along the rails. The end switches 42 and 150 are of the spring closing type so that when not in contact with the cam 41 they will be closed. The two central switches 148 and 149, however, are constructed so that the last one passed over by the cam remains open, while the other is closed.

As seen in Fig. 14, the transfer table having passed upwardly into alignment with stalls 1 and 2, the switch 148 remains open and the switch 149 is closed. When the transfer table moves toward stalls 5 and 6, passing over the switches 148 and 149, the switch 148 will be closed and the switch 149 will be opened, and will remain in this open position until the transfer table again passes these switches in its return toward stalls 1 and 2.

A similarly linked pair of double acting switches 151 and 152 are located on the transfer table to be actuated by a cam 153 mounted on the carriage 47 when the carriage is in centralized position. When the carriage passes to the right, the right hand switch 152 will be opened, and will remain open and left hand switch 151 will be closed. When the carriage passes to the left from a central position, the positions of these switches will be reversed. The mechanism for such a switch is well known to those familiar with the art, and it is believed unnecessary therefore to set forth the details of their structure.

A self-opening cam closing switch 154 is mounted on the transfer table and is positioned to be actuated by a cam 155 mounted on the carriage when the carriage is centralized on the transfer table.

Two other cam actuated switches 157 and 158 are mounted on the transfer table and are positioned to be actuated by cams 159 and 160, mounted on the carriage. The switch 157 is positioned to be engaged by the cam 160 and the switch 158 by the cam 159 as the carriage reaches its outer limits of movement into a left or right hand stall, respectively, from the position illustrated in Fig. 14.

A safety switch 161 is mounted on each of the positioner arms 86 and 87, but is here illustrated as mounted only on the right hand positioner arm. This safety switch 161 is connected into the operating circuit in series with the cam actuated switch 158 and is normally closed. Should the actuating element of the switch 161, exposed on the outer face of the positioner arm, encounter a bumper of an automobile in a stall in which the carriage is endeavoring to park an automobile, this safety switch would be opened by contact with the bumper of the already parked automobile. This would open the main operative circuit of the device, and would arrest further movement of the carriage into the already filled stall. This switch is an emergency device and is not part of the normal operating circuit.

Six operating buttons 162 are illustrated, numbered 1 to 6 to correspond with the similarly numbered parking stalls. These buttons preferably are mounted on a suitable panel which may be located near the entrance stall. An emergency stop button 163 is provided to open the main operating circuit in case of an emergency. The reversible motor 94 for operating the carriage 47 is mounted on the transfer table 20, and the reversible traversing motor 35 for the transfer table is mounted adjacent one end of the runway 17. Solenoid operated reversing switches 164 and 165 are provided for the transfer table motor 35, and similar switches 167 and 168 are provided for the carriage motor.

Manually operated line switches 169 and 170 are provided for connecting the circuit to three line conductors 171, 172 and 173 which are connected to a suitable source of electricity.

A time delay solenoid switch 174 is provided in the circuit. This switch is normally closed, and is of a type which opens instantly on being energized, but which has a dash pot or other suitable impeding device 175 which delays re-closing of the switch contacts for a predetermined time interval after the relay has been energized.

Two interlocking double upper and single lower contact relays 177 and 178 are provided for the carriage motor control phase of the circuit. Two double upper contact relays 179 and 180 are arranged to operate in conjunction with the carriage motor and time delay switches. Three single contact relays 181, 182, 183 are provided as stall selectors, and two single upper, double lower contact relays 184 and 185 are provided for the transfer table motor control phase of the circuit.

For purposes of simplification the conductors employed will be assigned reference numbers as they are referred to in conjunction with a description of their various functions in the circuits in which they are employed.

To illustrate the operation of the circuits illustrated, we may assume that an automobile located in No. 1 entry stall 22, is to be parked in stall No. 4. The operator first will press operating button 162, No. 1, which will bring the transfer table 20 to a position between stalls Nos. 1 and 2, and will project the carriage 47 into stall No. 1. The positioner arms 80 and 87 then will be raised to a vertical position and moved into engagement with the bumpers of the automobile in stall No. 1.

As the positioner arms 80 and 87 move inwardly toward each other they will center the automobile relatively to the carriage 47. The carriage then will be returned to its position on the transfer table, moving the car along with it, the wheels of the car rolling first in the channels in the stall and later in the co-extensive channels on the transfer tables.

Thereafter, the operator will press push button No. 4 which will cause the transfer table to move into alignment with stall No. 4, after which the carriage will move endwise into stall No. 4, carrying the automobile with it. The positioner arms then will be retracted, and the carriage will be withdrawn onto the transfer table, leaving the car parked in the stall.

The movement of the car from entry stall No. 1 onto the transfer table is accomplished as follows: When control button 162, No. 1, is pressed to close its contacts, current flows from the line conductor 173 through the switch 170, through conductors 187 and 188 through the stop switch 163 and then through conductors 189, 190 and 191 and the closed contacts of push button switch No. 1 to conductor 192. Conductor 192 is the main conductor from the odd numbered push button switches which control parking in the odd numbered stalls. From conductor 192 the circuit continues through a conductor 194, through the normally closed contacts of the cam controlled switch 157 on the carriage, then through a conductor 195, through the coil of relay 177, thence through the lower normally closed contacts of relay 178, through conductors 198 and 196, through the line switch 169 to the line conductor 172.

Relay 177 then becomes self-holding from the conductor 173 through the stop switch 163, the conductor 190, the upper left hand contacts of relay 177, thence through a conductor 197, the conductor 194, cam actuated switch 157, the conductor 195, the coil of relay 177 and thence through the lower contacts of relay 178 to line 172. Closing of the right hand upper pair of contacts of relay 177, connected the coil of the solenoid actuated carriage motor control switch 167 from line 172 through the conductor 196, through the conductors 198 and conductors 199 and 200 and the closed upper right hand contacts of relay 177. Thence the circuit continues through a conductor 201, the coil of the solenoid actuated carriage motor control switch 167, conductors 202 and 203, and through the normally closed lower left hand contacts of the relay 184. From here the circuit continues through a conductor 204 through the normally closed right hand lower contacts of relay 185, and a conductor 205 to the cam actuated switch 39. This switch will be closed by the cam 40 since the transfer table is in alignment with the first pair of stalls. Hence the circuit continues through a conductor 206 to the line conductor 173.

The actuation of the switch 167 by the completion of this circuit closes a circuit through the carriage actuating motor 94 from the line conductors 171, 172, 173, and also through a magnetically released spring actuated brake 215 which exerts a braking action on the winch 95 at all times when the motor 94 is not energized. This stops the carriage promptly when the motor is de-energized and prevents over-run. A similar magnetically released brake 216 is provided for the transfer table winches 32 and 33.

Since the switches 167 and 168 are normal type motor reversing switches, it is believed unnecessary to trace in detail the circuits through the carriage motor 94. However, when the switch 167 closes, the brake 215 will be released, and the motor 94 will be actuated to operate the carriage winch 95 in a direction to move the carriage to the left from the position illustrated in Fig. 14 into stall No. 1, the positioner arms 80 and 87 being in horizontal retracted position during this movement of the carriage.

Closing of the motor switch 167 also energizes the coil of the time delay switch 174, through conductors 208 and 209, thus opening the lower normally closed contacts of time delay switch 174 and initiating the time delay cycle which must elapse before the contacts of this switch again will close.

The period of delay is timed so as to permit the carriage to enter the stall to which it is directed and for the positioner arms to be actuated fully before the switch again closes. This normally will be about five seconds.

When the carriage reaches its limit of movement into entry stall No. 1 beneath the automobile therein, the cam 160 will engage the cam actuated switch 157 and open it. Since this switch is in the holding circuit for relay 177, the opening of switch 157 will de-energize said relay, which will return to its normal upper open, lower closed condition. This opening of the relay 177 opens the circuit to the coil of the actuating solenoid on carriage motor switch 167, de-energizing the carriage motor circuit and releasing the spring pressed magnetic brake 215, to brake the winch 95.

Also, as the carriage 20 reaches its limit of operation into the stall, the star wheel 128 will be engaged by the actuating pin 147 in stall No. 1, causing the star wheel to be rotated 60° in a counterclockwise direction from its position in Fig. 6, operating the cam 117 through a similar angle and causing an impulse to be delivered to the valve 103 which introduces compressed air into the cylinder 55 and actuates the piston 57, moving it inwardly away from the gland end of the cylinder and drawing the positioners 80 and 87 inwardly toward each other.

As the positioners are moved inwardly they also will be swung to an upright position through the cam and roller action previously described. This causes the positioner arms to engage the bumpers of the automobile between them, and to center the automobile relatively to the carriage.

After the predetermined period for which the time delay switch 174 is adjusted, the contacts of this switch will return to their normal closed condition. This completes a circuit from line 173 through the conductors 187 and 188, stop switch 163, the conductor 189 and a conductor 210, through the lower contacts of the time delay switch 174, and a conductor 211 to the cam actuated switch 152.

As previously described, the cam actuated switches 151 and 152 are connected together by linkage so that when the cam 153 moves to the left switch 152 will be left closed and 151 opened, while on a reverse movement of the cam as the carriage is moved into a right hand stall, the positions of these switches will be reversed.

Since the carriage at the moment of the closing of the contacts of the time delay switch 174 is at its left hand limit of movement into stall No. 1, the switch 152 will be closed. Therefore, the circuit will continue through the closed contacts of switch 152, a conductor 212, the coil of relay 180 and thence through the conductor 196 to the line conductor 172. On the closing of the relay 180 a holding circuit for this relay is completed from the line conductor 173 through the stop switch 163 to the conductor 190, thence through the conductor 210, a conductor 213, the upper right hand closed contact of relay 180, thence through a conductor 214 around the contacts of time delay switch 174 and through the previously described closing circuit for relay 180 including conductors 211, 212, the coil of relay 180, and conductor 196, to line conductor 172.

When the relay 180 is energized, a reversing circuit is completed through the actuating coil of the carriage motor switch 168. This circuit includes the line conductor 173 and the conductor 206 to one side of the cam control switch 39, thence through the conductor 205, the closed lower contacts of the relay 185, the conductor 204, the closed lower contacts of the relay 184, the conductor 203, the coil of the solenoid of switch 168, and thence through a conductor 214, a conductor 215, the closed left hand upper contact relay 180, and thence through the conductors 199 and 198 and the conductor 196 to the line conductor 172.

The closing of the carriage motor reversing switch 168 returns the carriage with the automobile secured between its positioning arms 80 and 87 onto the transfer table. The carriage is stopped in centralized position on the transfer table by the opening of switch 152 by the cam 153, which opens the holding circuit to relay 180, thus restoring all parts of the circuit to their normal condition.

After the carriage with the automobile gripped between the positioners 80 and 87 comes to rest in the central position on the transfer table, the operator presses button No. 4 to move the car into stall No. 4. On pressing the No. 4 button two circuits are completed; one to move the transfer table in front of the No. 4 stall, and the other, which is not completed until the transfer table arrives in properly registering position with the stall No. 4, to move the carriage with the car into stall No. 4.

The circuit for moving the transfer table when No. 4 button is pressed is as follows: From line conductor 173 through the closed contacts of stop switch 163 through the conductors 189, 190 and a conductor 220, to the central contact of switch No. 4, thence through a conductor 221, the coil of the relay 182, a conductor 222 and through the closed contacts of switch 149.

It will be recalled that switches 148 and 149 are linked together so that when the transfer table is toward the No. 1 stall from these switches, switch 148 will be open and switch 149 closed, while, when the transfer table moves into registry with stalls Nos. 3 and 4, the switch 149 will be opened. When the transfer table moves beyond stall No. 3, switch 149 will remain open and 148 closed.

From the switch 149 the circuit continues through a conductor 223, the coil of relay 185, a conductor 224, the normally closed lower right hand contacts of the relay 184, and thence through conductors 225 and 227 to the line conductor 172. When the relay 182 is energized, it closes a locking circuit around No. 4 switch button, whereby the conductor 190 and the closed top contacts of relay 182 replace the original actuating circuit for this relay, which was through conductor 221 and the contacts of switch No. 4.

The energizing of relay 185 completes a circuit from line 172 through the conductor 227 through a conductor 229 through the closed upper contacts of relay 185, thence through a conductor 230 through the actuating coil of the transfer table motor control switch 164, thence through a conductor 231, a conductor 232, the closed contacts of switch 154 and thence through the conductor 187 to line conductor 173.

This closes switch 164 which operates the transfer table motor 35 and simultaneously releases the magnetically releasing brake 216. The motor 35, by means of the winches 32 and 33 and associated cables, moves the transfer table toward stall No. 4. The transfer table is stopped directly in registry with stall No. 4 by the opening of the switch 149 by the cam 41 on the transfer table. Since the switch 149 is, as previously described, in the holding circuit for the relay 185, it is apparent that this opens the transfer table motor control circuit.

After the transfer table comes into registry with the stalls Nos. 3 and 4, the other, or carriage motor circuit previously mentioned, is completed as will be explained. This carriage operating circuit is from the line conductor 173 through the stop button 163 through the conductors 189, 190 and 220, to the central contact of switch button No. 4, thence through a conductor 233, a conductor 193, a conductor 234, the closed contacts of switch 158 and the emergency stop switch 161, thence through a conductor 235, the coil of relay 178, a conductor 237, the lower normally closed contacts of relay 177 and conductors 198 and 196 to the line conductor 172.

When the relay 178 is energized it closes a holding circuit around No. 4 button through its upper right contacts through the stop switch 163 and conductor 190, and thence, as previously described for the closing circuit of this relay. Thus it will be noted that on release of button No. 4 both of the presently described circuits are held until the completion of the operations for which they are set.

After 178 is closed, deenergization of 185 completes another circuit from line 172 through the conductors 196 through the conductor 198, the conductor 199, the conductor 200, the closed upper left hand contact of relay 178, through the conductor 214, the actuating coil of switch 168, the conductor 203, the closed lower left hand contacts of relay 184, the conductor 204, the closed lower right hand contacts of relay 185, the conductor 205, the cam control switch 39 on the transfer table, and thence through conductor 206 to the line conductor 173.

However, it will be recalled that relay 185 was operated upon the closing of the transfer table motor actuating circuit so that this carriage motor control circuit is prevented from closing as long as relay 185 remains energized. The cam actuated switch 39 also, of course, will be open during the time of travel of the transfer table from the cam 40 to the next similar cam 237 on stall No. 4. When the transfer table arrives in registry with stall No. 4, however, this second circuit will be completed by the de-energizing of relay 185 and the closing of switch 39 to close carriage motor control switch 168. As the carriage motor 94 is energized through the switch 168, and the magnetically released brake 215 is energized to free the winch 95 for rotation, the carriage, with the automobile gripped by the positioners, is moved into stall No. 4 until the circuit through relay 178 is opened by the opening of the cam control switch 158 by the cam 159 on the carriage.

As the carriage reaches its full limit of travel into the stall, the star wheel 128 will be engaged by the operating pin 147 in stall No. 4, which will rotate the cam 117 through an angle of 60°, causing the next successive cam lobe to reverse the last previous movement of the piston. In this case it will cause the positioner arms to separate, releasing the bumpers of the automobile, and will move the positioners to their full outer retracted position.

At the time the carriage motor control switch 168 is closed, the time delay switch 174 also will be energized as previously mentioned. After the elapse of the previously mentioned predetermined time interval, which allows for the travel of the carriage into the stall, and for the positioner arms to complete their predetermined half cycle of operation, the time delay switch again returns to its normal closed position. On closing of the lower contacts of the time delay switch, a circuit is completed from line 173 through the stop button 163, the conductors 190 and 210, the lower closed contacts of switch 174, thence through the conductors 211, the closed contacts of switch 151, a conductor 239, the coil of relay 179 and thence through the conductor 196 to the line conductor 172.

Energizing of relay 179 completes a holding circuit from the line conductor 173 through the stop button 163, through the conductors 190, 210 and 213, thence through the closed upper left hand contacts of relay 179, the conductors 214, 211, the closed contacts of switch 151, thence through a conductor 239 and coil of relay 179 to the line conductor 172. This holding circuit is necessary since the time delay switch 174 will be opened while the carriage is returning to its position on the transfer table.

The carriage return circuit which is completed by the closing of the switch 174 and thence the energizing of the relay 179, as above described, is from the line conductor 172 through the conductors 196, 198 and 199, the right hand upper contacts of relay 179, a conductor 240, the conductor 201, the coil of the carriage motor operating switch 167, thence through the conductors 202, 203, the lower left hand contacts of relay 184, the conductor 204, the lower right hand contacts of relay 185, thence through the conductor 205, the cam actuated switch 39 on the transfer table, and thence through the conductor 206 to the line conductor 173. The closing of the carriage control switch 167 moves the carriage back onto the transfer table, and since the positioner arms are retracted during this movement the automobile is left parked in the stall.

When the carriage returns to its central position on the transfer table the switch 151 is opened by the cam 153, thereby opening the carriage control circuit and restoring all parts to normal.

The description of this much of the operation of the system is believed sufficient to enable one familiar with the art to understand clearly how the cars can be parked and withdrawn from any of the stalls at the selection of the operator. Since the carriage is never sent into a stall except either to deposit or withdraw an automobile, and since it requires two half cycles for either operation, the alternate operation of the positioner arms is desirable and makes this feature an operation entirely automatic.

The arrangement is simple, trouble free, and is protected by adequate safeguards so that there will be no danger of discharging an automobile from the transfer table, except when the transfer table is aligned with a stall. Furthermore, there is no danger in attempting to park an automobile in a stall which is already occupied since in such case the emergency switch 161 on the positioner arm would engage the bumper of the already parked automobile and open the carriage motor control circuit.

The device is equally adapted for use on one parking level, as in a parking lot, or on numerous floors or levels of any suitable structure.

While I have illustrated and described a preferred embodiment of my invention, it will be understood by those familiar with the art that the invention is capable of numerous modifications without departing from the spirit of the invention. It is desired, therefore, not to limit the invention except as defined in the following claims.

I claim:

1. In a vehicle parking system having a pair of longitudinally separated aligned compartments, a vehicle carrying platform movable into position between said compartments, actuating means operatively controlling movement of said platform, a carrier mounted on the platform for movement selectively into and out of either compartment, a pair of endwise movable vehicle engaging members mounted on said carrier, intercontrolled actuating means mounted alternately to move said vehicle engaging members toward and away from vehicle engaging position, cam means mounted to move said vehicle engaging members to vehicle clearing position at an outer portion of movement away from vehicle engaging position, striker actuated control means mounted to actuate said vehicle engaging members alternately through half cycles of operation toward and away from vehicle engaging position on each actuation of said striker actuated control means, and a striker in each of said compartments, the strikers in said compartments being offset from each other relatively to the path of movement of said carrier into and out of said compartments, operatively to engage said striker actuated control means at a predetermined point in the travel of said carriage.

2. In a vehicle parking system having a pair of longitudinally separated aligned compartments, a vehicle carrying platform movable into position between said compartments, actuating means operatively controlling movement of said platform, a carrier mounted on the platform for movement selectively into and out of either compartment, a pair of endwise movable vehicle engaging members mounted on said carrier, intercontrolled actuating means mounted alternately to move said vehicle engaging members toward and away from vehicle engaging position, cam means mounted to guide said vehicle engaging members to vehicle clearing position at an outer portion of movement away from vehicle engaging position, and control means mounted to actuate said vehicle engaging members alternately through half cycles of operation toward and away from vehicle engaging position on each actuation of said control means.

3. In a parking system wherein there is a fixed storage compartment and a movable platform from one to the other of which a vehicle is transferable, a vehicle transferring device comprising a carrier mounted on the platform for movement into and out of the compartment, a pair of vehicle engaging members mounted on the carrier for combined pivotal and axial movement in directions longitudinally of the carrier alternately to engage and release a vehicle positioned therebetween, striker controlled actuator means carried by said carrier to operate said vehicle engaging member through alternate halves of a complete cycle on an operation of said striker controlled actuator means, and a striker in said compartment positioned operatively to engage said striker controlled actuator means on each movement of said carrier into and out of said compartment.

4. In a parking system wherein there is a fixed storage compartment and a movable platform from one to the other of which a vehicle is transferable, a vehicle transferring device comprising a carrier mounted on the platform for movement into and out of the compartment, a pair of vehicle engaging members mounted on the carrier for combined pivotal and axial movement in directions longitudinally of the carrier alternately to engage and release a vehicle positioned therebetween, striker controlled actuator means carried by said carrier to operate said vehicle engaging members through alternate halves of a complete cycle on each complete cycle of said striker controlled actuator means, said striker controlled means comprising a base, a cam having non-reversible ratchet connection with said base, a striker actuated snap control member having non-reversible ratchet connection with said cam, vehicle engaging member control means operatively associated with said cam, spring means mounted to urge said striker controlled means members toward an operative position relatively to each other, and striker means in said compartment positioned operatively to engage said striker controlled actuator means on each movement of said carrier into and out of said compartment.

5. In a parking system wherein there is a pair of longitudinally separated fixed storage compartments and a movable platform from which a vehicle is transferable into and out of a selected storage compartment, a vehicle transferring device comprising a carrier mounted on the platform for movement into and out of a selected compartment, a pair of vehicle engaging members mounted on the carrier for combined pivotal and axial movement in directions longitudinally of the carrier alternately to engage and release a vehicle positioned therebetween, striker controlled actuator means carried by said carrier to operate said vehicle engaging members through alternate halves of a complete cycle on each complete cycle of said striker controlled actuator means, said striker controlled actuator means comprising a base, a cam having non-reversible ratchet connection with said base, a striker actuated control member having non-reversible ratchet connection with said cam, said striker actuated control member having striker actuated elements extending in opposite directions from said cam, vehicle engaging member control means operatively associated with said cam, spring means mounted to urge said striker controlled members toward an operative position relatively to each other, and striker means in each of said compartments positioned operatively to engage said striker controlled actuator means on each movement of said carriage into and out of said compartment, the striker means in one compartment being offset from that in the compartment opposite thereto to engage oppositely extending elements of said striker actuated control member.

6. In a vehicle transfer carriage for use as described, carriage frame, a closed cylinder mounted longitudinally of the carriage frame, a piston in said cylinder, a piston rod on the piston, fluid power means for operating said piston, a block slidably mounted in said frame beyond one end of the cylinder and connected to said rod, a second block slidably mounted in the frame beyond the other end of said cylinder, a vehicle engaging member operatively associated with each block, interengaging means on said vehicle engaging members and said frame to cause said members to assume a vehicle engaging position when moved inwardly toward each other, and chain drive means connecting said blocks for moving said second block oppositely to said first-mentioned block upon movement of said first-mentioned block.

7. In a vehicle transfer carriage for use as described, a carriage frame, a closed cylinder mounted longitudinally of the carriage frame, a piston in said cylinder, a piston rod on the piston, fluid power means for operating said piston, a block slidably mounted in said frame beyond one end of the cylinder and connected to said rod, a second block slidably mounted in the frame beyond the other end of said cylinder, a vehicle engaging member operatively associated with each block, interengaging means on said vehicle engaging members and said frame to cause said members to assume a vehicle engaging position when moved inwardly toward each other, chain drive means connecting said blocks for moving said second block oppositely to said first-mentioned block upon movement of said first-mentioned block, valve means controlling said fluid power means, and valve actuating means including a movable member on said carriage adapted to be operated by an abutment located in the path of the carriage upon movement of the carriage therepast.

RICHARD L. SINCLAIR.

REFERENCES CITED

The following references are of record in the file of this patent:

UNITED STATES PATENTS

| Number | Name | Date |
|---|---|---|
| 1,988,619 | Buettell | Jan. 22, 1935 |
| 2,077,233 | Hendricks | Apr. 13, 1937 |
| 2,428,856 | Sinclair | Oct. 14, 1947 |